US012630073B2

(12) United States Patent
Massey et al.

(10) Patent No.: US 12,630,073 B2
(45) Date of Patent: May 19, 2026

(54) LIGHT SYSTEM WITH AUTOMATICALLY ADJUSTABLE INTERNAL MOTOR

(71) Applicant: Valeo Vision, Bobigny (FR)

(72) Inventors: Andrew Massey, Seymour, IN (US); Jeremy Gahimer, Seymour, IN (US)

(73) Assignee: Valeo Vision, Bobigny (FR)

( * ) Notice: Subject to any disclaimer, the term of this patent is extended or adjusted under 35 U.S.C. 154(b) by 258 days.

(21) Appl. No.: 18/526,648

(22) Filed: Dec. 1, 2023

(65) Prior Publication Data

US 2025/0178516 A1 Jun. 5, 2025

(51) Int. Cl.
    *B60Q 1/076* (2006.01)
    *B60Q 1/04* (2006.01)

(52) U.S. Cl.
    CPC ............. *B60Q 1/076* (2013.01); *B60Q 1/045* (2013.01); *B60Q 1/0466* (2013.01); *B60Q 1/0483* (2013.01); *B60Q 2200/38* (2013.01)

(58) Field of Classification Search
    CPC .... B60Q 1/045; B60Q 1/0466; B60Q 1/0483; B60Q 1/076; F21V 31/00; F21V 31/005
    USPC ................................ 362/523, 526, 527, 525
    See application file for complete search history.

(56) References Cited

U.S. PATENT DOCUMENTS

| | | | |
|---|---|---|---|
| 3,925,656 A | 12/1975 | Andres et al. | |
| 5,052,665 A | 10/1991 | Sakuragi | |
| 5,070,433 A * | 12/1991 | Zillgitt | B60Q 1/076 362/514 |
| 5,251,114 A | 10/1993 | Cantin et al. | |
| 5,673,991 A | 10/1997 | Eickhoff et al. | |
| 5,673,992 A | 10/1997 | Schmitt | |
| 6,568,837 B2 * | 5/2003 | Denley | B60Q 1/0683 362/523 |
| 2004/0012360 A1 | 1/2004 | Yuen | |

FOREIGN PATENT DOCUMENTS

| | | |
|---|---|---|
| DE | 3914911 A1 | 11/1989 |
| EP | 0546938 A1 | 6/1993 |
| EP | 1675751 B1 | 12/2010 |
| JP | S60194802 U | 12/1985 |

OTHER PUBLICATIONS

Ultramotion, "Underwater Linear Actuators," https://www.ultramotion.com/industries/underwater-subsea-linear-actuator/ 1/4 Underwaterlinearactuators, last accessed Nov. 30, 2023, Ultra Motion 1994-2023, 4 pgs.
Written Opinion and International Search Report of the International Search Authority for PCT/US2024/056538, mailed Feb. 18, 2025, 12 pgs.

* cited by examiner

*Primary Examiner* — Thomas M Sember
(74) *Attorney, Agent, or Firm* — Young Basile Hanlon & MacFarlane, P.C.

(57) ABSTRACT

A light system including: a housing that is connectable within a vehicle, the housing including an interior and an exterior; a motor located within the interior of the housing and having a portion that extends through an opening in the housing to the exterior of the housing so that the motor is capable of moving the light system relative to the vehicle; and one or more seals that prevent fluids and/or debris from contacting the portion that extends through the opening in the housing, the opening in the housing, or both.

20 Claims, 4 Drawing Sheets

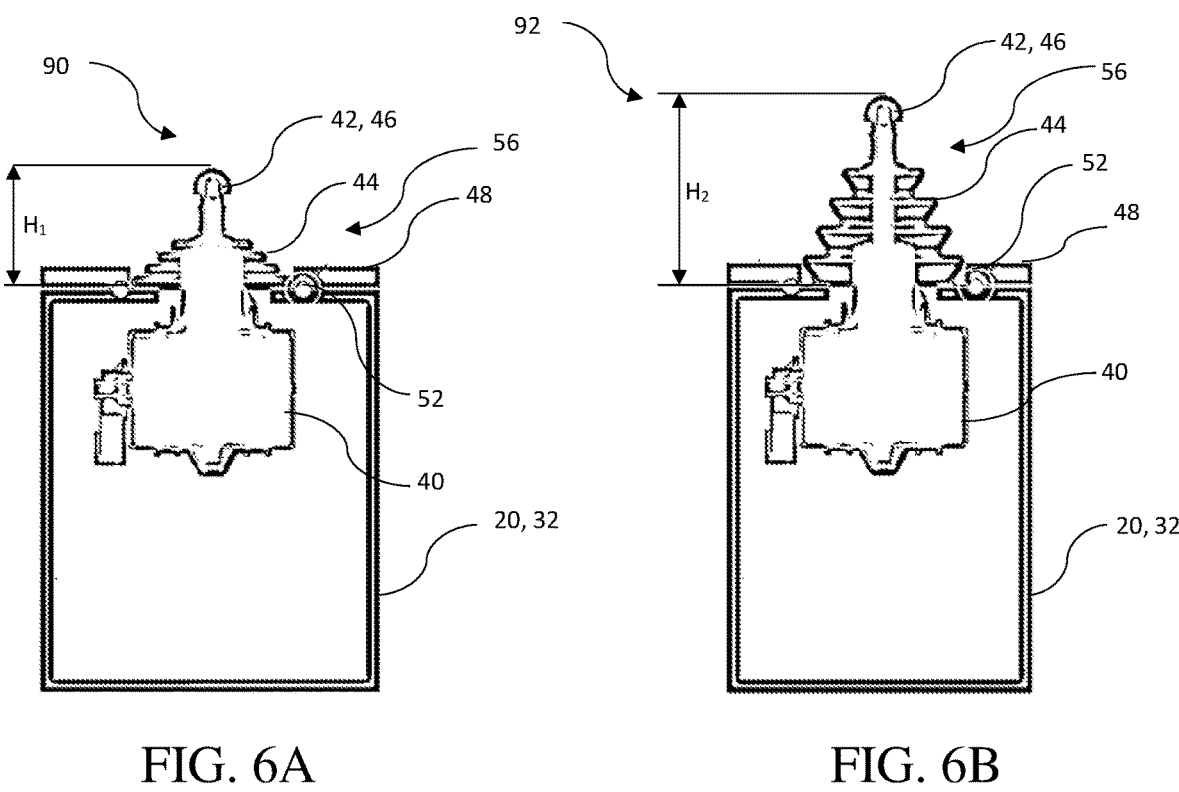
FIG. 6A                    FIG. 6B
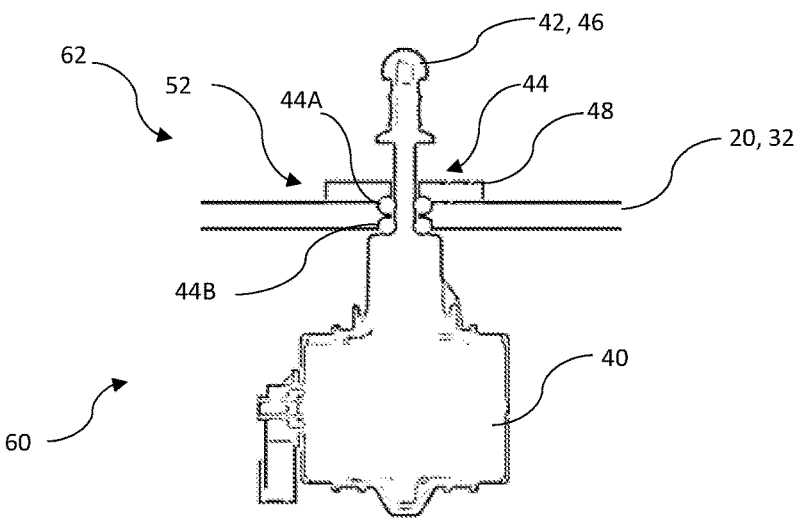
FIG. 7

LIGHT SYSTEM WITH AUTOMATICALLY ADJUSTABLE INTERNAL MOTOR

FIELD

The present teachings relate to a light system that includes an internal motor that automatically adjusts the light system so that the light system is aimed within a vehicle.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle. The light systems may have a predetermined light pattern extending therefrom. However, when the light system is installed within the vehicle, the predetermined light pattern may not extend to desired location.

Thus, there is a need for a light system that is capable of adjusting a location of the light pattern. There is a need for a light system adjustment to be made by an adjustment motor. There is a need for the motor and light system to be sealed so that contaminants (e.g., fluid or debris) are prevented from entering the motor and light system. There is a need for a light system where a portion of an adjustment motor is located within the light system and a portion of the adjustment motor extends outside the light system. It would be desirable to have a sealed light system and with unsealed motor that may be used without contaminants entering the motor, damaging the motor, or both. There is a need for an unsealed motor to be sealed from the external environment and while acting in the external environment.

SUMMARY

The present teachings provide: a light system including: a housing that is connectable within a vehicle, the housing including an interior and an exterior; a motor located within the interior of the housing and having a portion that extends through an opening in the housing to the exterior of the housing so that the motor is capable of moving the light system relative to the vehicle; and one or more seals that prevent fluids and/or debris from contacting the portion that extends through the opening in the housing, the opening in the housing, or both.

The present teachings provide a light system including: a housing that is connectable within a vehicle; a motor; one or more seals that prevent fluids and/or debris from contacting the motor; and one or more brackets in communication with the motor so that as the motor moves, the housing is moved relative to the one or more brackets and the vehicle.

The present teachings provide a light system that is capable of adjusting a location of the light pattern. The present teachings provide a light system adjustment to be made by an adjustment motor. The present teachings provide a motor and light system to be sealed so that contaminants (e.g., fluid or debris) are prevented from entering the motor and light system. The present teachings provide a light system where a portion of an adjustment motor is located within the light system and a portion of the adjustment motor extends outside the light system. The present teachings provide a sealed light system and with unsealed motor that may be used without contaminants entering the motor, damaging the motor, or both. The present teachings provide an unsealed motor to be sealed from the external environment and while acting in the external environment.

BRIEF DESCRIPTION OF THE DRAWINGS

FIG. 6A is a side view of the unsealed motor connected to the motor housing and the motor being in a first position.

FIG. 6B is a side view of the unsealed motor of FIG. 6A moved to a second position relative to the motor housing while remaining sealed to an external environment.

FIG. 7 is a cross-sectional view of an unsealed motor sealed within a motor housing.

DETAILED DESCRIPTION

Figure 1:
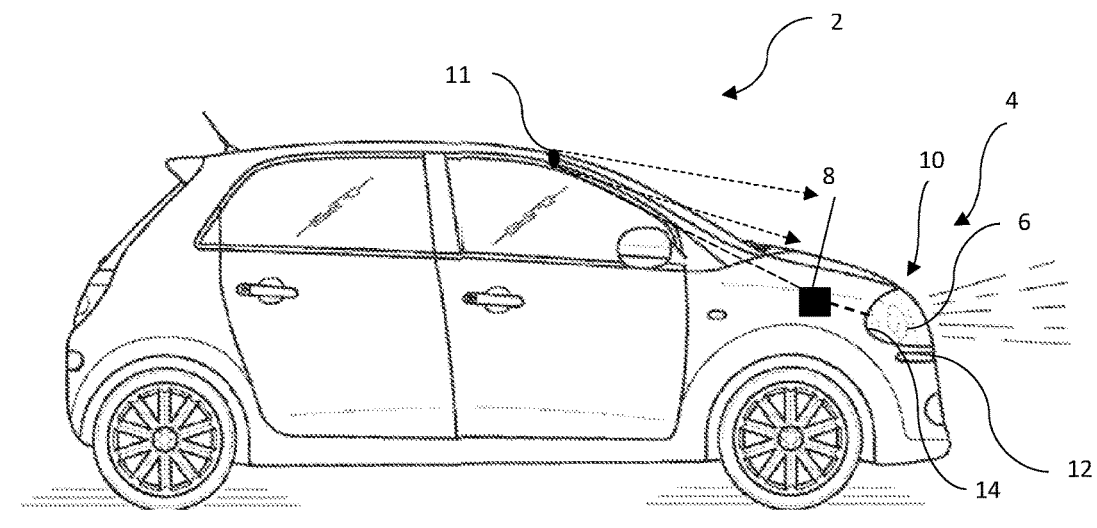
FIG. 1 is a side view of a vehicle including a light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, boat, jet ski, marine vehicle, or a combination thereof. The light system may project light in a forward direction, rear direction, side direction, vertical direction (e.g., z-axis), from a fore to an aft, an aft to a fore, or a combination thereof. The fore may be a forward direction of a vehicle or a front. The aft may be a rear direction of a vehicle or a rear. Preferably, the light system projects a light from an external surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems or light sources stacked one above the other, side by side, within different planes, within a same plane and projecting in different direction(s), integrated into a single light system, or a combination thereof. The light system may have multiple smaller light systems or light sources. The plurality of light systems or lights may be located in one light system. The plurality of light systems may operate independently of one another such that one light system may not affect another light system or portion of the light system. The light of the vehicle may be two or more, three or more, or four or more light systems located adjacent one another. The light system may be or include one or more static lights, one or more movable lights, and one or more light sources.

The light sources function to produce light. The light source may be a device or a plurality of devices that create light and the light extends outward from the light source. The light source may produce a high beam, a low beam, a blending beam, a running light, a daytime light, a turn signal, a brake light, or a combination thereof. The light sources may have different functions. For example, one light source may provide a running light and another light source may be a turn signal. Preferably, a first light source and a second light source combine together to provide a single light function. The light source may comprise a plurality of lights or may be a single light source within a set of light sources. The plurality of lights may be in one set or group of light sources. The plurality of lights may be located in rows, columns, a matrix, or a combination thereof. The light source may be a single light that projects light. In another example, a light source may direct light in a first direction and a second light source may direct light in a second direction that is different from the first direction. The first light from a first light source and the second light from a second light source may extend in different directions but may be visibly combined to provide a light function. The first direction may be along a z-axis within a coordinate system. The second direction may be along an x-axis within a coordinate system.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light sources may be a single lamp or bulb. Preferably, the light sources are part of a set of light sources that includes a plurality of lamps, bulbs, diodes, or a combination thereof. The light sources may be part of a set of light sources that includes 2 or more, 3 or more, 4 or more, 5 more, 7 or more, 9 or more, or 11 or more light sources that produce light and combine together to form the light extending from the light system. The sets of light sources may include 20 or less, 18 or less, 16 or less, or 14 or less devices that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 light sources that are all located on the single printed circuit board. The set of light sources may be two or more groups of lights that are located on different printed circuit boards. The printed circuit boards may be located adjacent to one another or spaced apart from one another. The number of light sources in a part of the light may dependent upon a size of the region or a size illuminated. For example, a daytime running light may have eight or more light sources and a turn signal may have five or more light sources. In another, example, the daytime running light may include two or more groups of light sources that are spaced apart from one another such that when the two or more groups of light sources are on they combine to provide the first light function.

The light source may be one or more lights, two or more lights, or three or more lights. The light source may be static. The light sources may be free of movement. The light source may be fixed. The light sources may be a row of lights, a column of lights, a matrix of lights extending in rows and columns, or a combination thereof. The matrix may be made up of a single printed circuit board. The matrix may be a plurality of printed circuit boards that are located proximate to one another to form the matrix. The light sources may be static and may be manually or physically adjusted so that the light sources are directed to a desired location. The light sources may be fixed and the light from the light source may be moved, bent, directed, or a combination thereof by optical elements, textured portions, micro-optics, reflectors (e.g., a light guide), light blades, or a combination thereof. Each individual light of the light source may be turned on and off. The light sources may provide light towards a reflector and then the reflector may redirect (i.e., reflect) the light in a second direction.

The light sources of the light system may produce one light function and a second light source may produce a second light function. One light system (e.g., a bi-directional light system) may include a plurality of light sources (e.g., two or more) that produce one light function. The light system may perform only a single light function. The light system, via the light sources, may perform or provide one or more light functions, two or more light functions, or even three or more light functions. For example, the light system may provide a low beam, a high beam, a daytime running light, or a combination thereof. The light sources may be directed towards reflectors that produce a light function with a light pattern (e.g., a headlight).

The reflectors may all be located within a housing and function to redirect the light in a predetermined pattern. The reflectors may direct light between an upper housing and a lower housing. The reflectors may direct light through a lens. The reflectors may all direct light and the light may combine to form a predetermined pattern. The reflectors may each provide light to a predetermined region to form part of a pattern, part of a function, or both. One reflector may be located adjacent to one light source. The reflectors may be a plurality of reflectors. The light system may include two or more, three or more, four or more, six or more, eight or more, ten or more, twelve or more, or even fourteen or more reflectors. The light system may include 50 or less, 40 or less, 30 or less, 20 or less, or 15 or less reflectors located within a housing.

The headlight may include one or more portions of a housing and an outer lens. The reflectors and light sources may be located internal of the housing and the outer lens. The housing functions to connect the light system within a vehicle, retain reflectors within a vehicle, hold the reflectors in a predetermined position, support two or more light sources relative to the reflectors, support two or more printed circuit boards relative to the reflectors and/or light sources, or a combination thereof. The housing may include an upper housing, lower housing, motor connector, motor housing, or a combination thereof. The housing may be made of or include metal, plastic, a polymer, a polycarbonate, or a combination thereof. The housing may be substantially rigid, have flexible regions, movable regions, or a combination thereof. The housing may receive one or more fasteners or a plurality of fasteners. The housing may include walls such that the housing forms a box. The housing may include a bottom wall, first side wall, second side wall, fore wall, aft wall, or a combination thereof. The housing may be free of a top wall so that the top of the housing is open. The housing may form an entirely sealed container. The housing may be sealed such that water, debris, or both are prevented from entering the housing. The housing may permit wires to extend therein while maintaining a sealed condition. Some or most of the components may be connected to the housing through a top of the housing so that a stack up may be formed in an internal location of the housing. The housing may be made up of an upper housing, a lower housing, an outer lens, a lens, a motor housing, or a combination thereof. The lens between the upper housing and the lower housing may be a monolithic piece of the upper housing or the lower housing and/or an outermost portion of the housing. The housing may be a monolithic piece. The housing, reflectors, printed circuit boards, or a combination thereof may include one or more heat sinks. The heat sinks may remove heat generated by the light sources, motors, or both. The housing may be positioned within a vehicle to direct light to a location external of the housing.

The one or more lenses function to direct the light from the reflectors to a location to be illuminated external of the housing. The lenses may function to protect the lights, the reflectors, or both. The lenses may bend light. The lenses may refract light. The lenses may diffuse the light, blend the light, spread the light, direct the light to a predetermined location, create one or more hot spots, create a homogeneous lighting appearance, prevent hot spots, or a combination thereof. The lens may be located in front of the reflectors (e.g., static reflectors, movable reflectors, or both). The lenses may cover all or a portion of the light system, the light sources, light bars, light blades, reflectors, or a combination thereof. Each light system may include a lens. The light system may include a single lens that covers each of the reflectors or light sources that each provide or perform a different function. The lens may cover the reflectors, light source, or both so that light, direct light, reflected light, or a combination thereof extends through the lens. The lens may be one or more lenses. The lens may be a plurality of lenses. The lens (e.g., primary lens or internal lens) may be a single lens. The one or more lenses may have a shape that directs light to a predetermined location. The one or more lenses may be flat, planar, bio-convex, plano-convex, positive meniscus, negative meniscus, plano-concave, bio-concave, double convex, converging, diverging, or a combination thereof. Each lens may be a single lens. Each lens may be a compound lens (e.g., there may be more than one lens). Each lens has a forward side (or forward surface) and a rearward side (or rearward surface). The lens may include one or more texture portions. The lens may be an interior lens and may cover a headlight portion of a light system. The lens may form a forward side of the housing and a motor housing may be located behind the lens.

The motor housing functions to contain a motor therein. The motor housing may be a recess formed within the upper housing, the lower housing, or both. The motor housing may hold a motor, protect a motor, insulate a motor, waterproof a motor, waterproof an unsealed motor, or a combination thereof. A portion of the motor may be located within the motor housing and a portion of the motor may extend outside of the motor housing. The motor may be free of a motor housing. The motor may be a sealed motor or an unsealed motor. An unsealed motor may be a motor that does not have a waterproof housing that prevents fluids from entering the motor. The motor may be free of sealing that prevents fluids from contacting the motor. The motor may not be a sealed motor. The motor may be an actuator. The motor housing may mirror a shape of the motor. The motor may be connected to the motor housing. The motor housing may house the motor and a shaft may extend through the motor housing. The motor may be unsealed and the shaft may be unsealed and a seal may prevent fluids from contacting the motor, contacting all or a portion of the shaft, or both. The motor housing may be separate from a vehicle light. The motor housing may be part of a vehicle light. The motor, motor housing, or both may be oriented vertically (e.g., facing up or down), horizontally, diagonally, or a combination thereof. The motor, the shaft, or both may be sealed from an external environment (e.g., fluid, debris, or both). Thus, the motor may be located within an interior of the motor housing and the shaft may extend to an exterior of the motor housing.

The shaft functions to move the motor, the housing, the light system, or a combination thereof relative to a vehicle. The shaft may extend linearly. The shaft may convert rotational motion to linear motion. The shaft may extend through the motor housing so that the shaft is located external of the housing. The shaft may extend through the housing and a retainer, seal, or both.

A retainer may function to assist in sealing around the shaft. The retainer functions to connect a seal to the housing. The retainer functions to create a watertight connection adjacent to an opening in the housing. The retainer may be located adjacent to the housing. The retainer may be free of contact with the shaft. The retainer may form an annular ring around the shaft. The retainer may surround a base around of the shaft. The retainer may be connected to the housing. The retainer may be made of a same material as the housing. The retainer may be connected to the housing by one or more fasteners. The retainer may be snap fit to the housing. One or more screws may extend through the retainer and housing. The retainer may be located on an inside of the housing, on an outside of the housing, or both. The retainer may be spaced apart from the housing. The retainer may be part of the housing, part of the motor, part of the seal, or a combination thereof. The retainer may be connected to the housing, but a space may be located between the housing and the retainer so that all or a portion of a seal may be located within the space.

A seal functions to prevent fluid, debris, or both from extending into the housing in a region proximate to the shaft. The seals may form a perimeter around the shaft. The seals may be located within the housing, between the housing and the shaft, outside of the housing, or a combination thereof. The seals may extend outside of the shaft. The seals may encapsulate the shaft, a hole in the housing, or both. The seals may be connected to the housing by one or more retainers. The seals may have a first end located proximate to the housing and a second end located proximate to an end of the shaft (e.g., a shaft joint). The seals may be compressed between the retainer and housing (e.g., contract). The seals may be axially movable. The seals may move with the shaft. The seals may be movable towards and away from the housing. The seals may include one or more expansion regions (e.g., expand). The expansion regions may one or more folds, accordions, elongation regions, pleats, or a combination thereof. The seals may maintain a sealed relationship as the shaft moves relative to the housing (e.g., from a first position to a second position). The seals may stretch as the motor moves the shaft to an adjusted position. The seals may be made of a flexible material. The seals may be made of a rigid material with flexing regions formed into the seals. The seals may be made of or include an elastomer, rubber, silicone, or a combination thereof. The seals may be made of a fluid impenetrable material. The seals may be made of a hydrophobic material. The seals may be non-porous. The seals may be a film. The seals may retract as the motor moves the shaft back to an original position. The seals may extend around the shaft and form a sealing area.

The seals may be an inner seal and an outer seal. The inner seal may face an interior of the housing and the outer seal may face an exterior of the housing. The inner seal, the outer seal, or both may be in direct contact with a shaft, a housing, or both. The inner seal may be axially stacked relative to an outer seal (e.g., co-axial). The inner seal, the outer seal, or both may be an O-ring. The inner seal and the outer seal may be directly in communication with the shaft so that fluid is prevented from extending into the housing relative to the shaft extending through the housing. The sealing area may be where a seal is locked adjacent to the shaft. The sealing area may be where one or more sealing projections lock a seal around the shaft, around an opening in the housing, or both.

The sealing area may be between the shaft and the housing. The sealing area may be between the housing and a retainer. The sealing area may be adjacent to the shaft. The sealing area may be located a distance from the shaft. The distance may be about 1 mm or more, about 3 mm or more, about 5 mm or more, about 7 mm or more, or about 10 mm or more. The distance may be about 5 cm or less, about 4 cm or less, about 3 cm or less, or about 2 cm or less. The sealing area may create a border around the shaft. The sealing area may surround the shaft at a location where the shaft extends through the housing. The sealing area may be an area where a seal is compressed. The seals may be a single seal that extends axially away from a housing along the shaft. The seals may be stacked one above another.

The seals may be an inner seal and an outer seal. The inner seal may face an interior of the housing and the outer seal may face an exterior of the housing. The inner seal, the outer seal, or both may be in direct contact with a shaft, a housing, or both. The inner seal may be axially stacked relative to an outer seal. The inner seal, the outer seal, or both may be an O-ring. The inner seal and the outer seal may be directly in communication with the shaft so that fluid is prevented from extending into the housing relative to the shaft extending through the housing. The sealing area may be where a seal is locked adjacent to the shaft. The sealing area may be where one or more sealing projections lock a seal around the shaft, around an opening in the housing, or both.

The sealing projections function to lock one or more seals within the light system. The sealing projection may lock the seal between the retainer and the housing. The sealing projection may extend outward from the seal. The sealing projection may be an annular bump on a portion of the seal. The sealing projection may extend into the retainer, the housing, or both. The projection may extend outward into a recess in the housing, the retainer, or both. The seal may include a recess that receives a projection of the housing, the retainer, or both. The sealing projection of a housing, a retainer, or both may deform the seal so that the seal is prevented from moving relative to the retainer, the housing, or both. The sealing projection may extend parallel to the shaft. The sealing projection may be located adjacent to a base of the shaft.

The seal may be connected to a motor connector, a shaft joint, or both via one or more joints. The joints function to connect the seal to a shaft joint. The joints may bond the shaft joint to the seal. The joints may create a fluid impenetrable connection. The joints may create a fluid resistant connection between the seal and the shaft joint. The joint may create an end-to-end connection between the seal and the shaft joint. The joint may be where a shaft joint overlaps a portion of a seal or vice versa. The joint may be formed mechanically, thermally, chemically, molecularly, or a combination thereof. The joint may be formed by melting the seal, melting the shaft joint, or both together. The joint may be an adhesive connection between the seal and the shaft joint. The joint may be a coupler that receives a portion of the seal and a portion of the shaft joint so that a waterproof connection is formed. The joint may be a mechanical connection where the seal and the shaft joint are connected together. The joint may seal the shaft, an opening through the housing, or both within a seal so that the shaft is movable without allowing fluids to enter into the housing. The joint may connect a shaft joint to a top of the shaft.

The shaft joint functions to create a pivot connection, a mechanical connection, or both at an end of the shaft. The shaft joint may be a ball or a socket. The shaft joint may permit motion in one direction or more, two directions or more, three directions or more, or four directions or more. The shaft joint may be made of a polymer, a thermoset, a thermoplastic, metal, or a combination thereof. The shaft joint may encapsulate an end of the shaft so that a fixed connection may be made with the shaft. The shaft joint may allow a fixed connection to be made that also allows movement about the shaft joint. The shaft joint may allow movement of a bracket relative to the shaft as the shaft moves along an axis. The shaft joint may be connected to a bracket via a motor connector.

The motor connector functions to connect to the shaft via the shaft joint. The motor connector functions to receive all or a portion of the shaft joint. The motor connector, shaft joint, or both may be a ball, a socket, a pivot, a connector, a U-shaped connector, a toroid, or a combination thereof. The motor connector and shaft joint may be complementary. For example, if the shaft joint is a sphere, then the motor connector is configured to receive a sphere and to form a movable connection with a sphere. The motor connector and the shaft joint may have a hole to receive a pin or a fastener. The motor connector and the shaft joint may pivot, rotate, flex, be rigid, or a combination thereof so that as the shaft moves the motor connector is moved. The shaft joint and the motor connector may connect the motor (via the shaft) to a bracket, a vehicle, or both.

The bracket functions to support the light system. The bracket functions to movably connect a light system within a vehicle. The bracket may connect to the light system at one or more points. The bracket may be connected to a vehicle, the light system, or both. The bracket may connect to the vehicle, light system, or both at one or more points, two or more points, three or more points, one or more line connections, two or more line connections, a line connection and a point connection, or a combination thereof. For example, a forward edge may have a line connection with a bracket creating a pivot at the front end and a rear end of the bracket may have a point connection. The line connection may allow the bracket, light system, or both to only move around a single axis (e.g., the line connection forms the single axis).

The bracket may have a forward end that connects to the vehicle and the forward end may have one or more arms and preferably two or more arms (e.g., bracket arms) that extend outward and create a connection with the light system.

The light system may pivot about the arms so that the light system may be translated towards or away from a vehicular surface (e.g., a road) or in another direction with respect to the vehicle. The arms may allow for rotation of the light system about one axis, two axes, or even three axes. For example, the arms may allow the light system to rotate up and down, tilt side to side, lift up and down, or a combination thereof. The arms may connect to the light system via a pin, fastener, bearing surface, or a combination thereof. The arms may be rigid and free of movement other than where the arms and light system connect. The arms may translate or move (e.g., from side to side, up and down, forward and back). The arms may facilitate movement of the light system relative to the bracket when the motor is activated.

A rear side of the bracket may connect to the shaft via the motor connector. The motor connector may translate a rear end of the light system in one or more direction, two or more directions, or three or more directions when the motor is activated. If more than one motor connector and shaft are present then more directions of movement may be created. For example, a shaft or a motor may move up and down, thus, the front of the light system may rotate about an axis and move up and down (first rotational direction). If two motors and shafts are present then one motor may move while one motor remains static such that only one side of the light system may move (second rotational direction). The motor, the motor shaft, or both may pivot such that the motor moves forward and aft (e.g., relative to a direction of motion of a vehicle) to create a third rotational direction of motion. The bracket may support the light system within the vehicle The bracket may connect the light system within the vehicle. The bracket may be substantially a same size and shape as the light system. Movement of the light system relative to the bracket by the motor may be controlled automatically by a controller.

The controller may control where the lights illuminate, a direction of illumination, a height the lights are directed over a road surface, or a combination thereof. The controller may be in communication with a sensor. The sensor may measure a light pattern of the light system. The sensor may measure where the lights are directed such that if the lights are not directed to a predetermined location the motor is actuated to move the light system. The sensor may be any sensor that measures light, the position, orientation of the vehicle, or a combination thereof. The sensor may determine a location light is directed from the light system, a location the light illuminates, or both. The light sensor may be a photodetector, a photodiode, photoresistor, phototransistor, a photovoltaic light sensor, or a combination thereof. The sensor may be an accelerometer, a vehicle orientation sensor, a location sensor, or a combination thereof. The controller may auto level the light system. The controller may measure a position of the motor within a vehicle. The controller may sense the position of the light system The controller may actuate the motor so that the motor moves the shaft up or down. The controller may be in communication with a plurality of sensors so if the light system loses alignment over time the motor may actuate to automatically direct the light to a desired location. The controller may also be controlled manually or automatically from other internal or external systems (e.g., of a vehicle).

FIG. 1 illustrates a side view of a vehicle 2 with a light system 4. The light system 4 is located within the vehicle 2 and covered by an outer lens 6. The light system 4 includes a controller 8 and adjustment mechanism 10. The controller 8 is in communication with the adjustment mechanism 10. The adjustment mechanism 10 is configured to move the light system 4 so that the light system 4 directs light to a predetermined location. The controller 8 may automatically activate the adjustment mechanism 10 so that the controller 8 and the adjustment mechanism 10 move the light system 4 to direct light to a predetermined location. The controller 8 may be manually activated to move the light system 4. The controller 8 may be in communication with a sensor 11 that monitors the location light is directed from the light system 4, monitors vehicle orientation, monitors vehicle location, monitors vehicle acceleration, or a combination thereof. The sensor 11 and controller 8 may activate the adjustment mechanism 10 so that the light system 4 is aimed to a location of interest. The light system 4 may further include a daytime running light 12 and a turn signal 14.

Figure 2A:
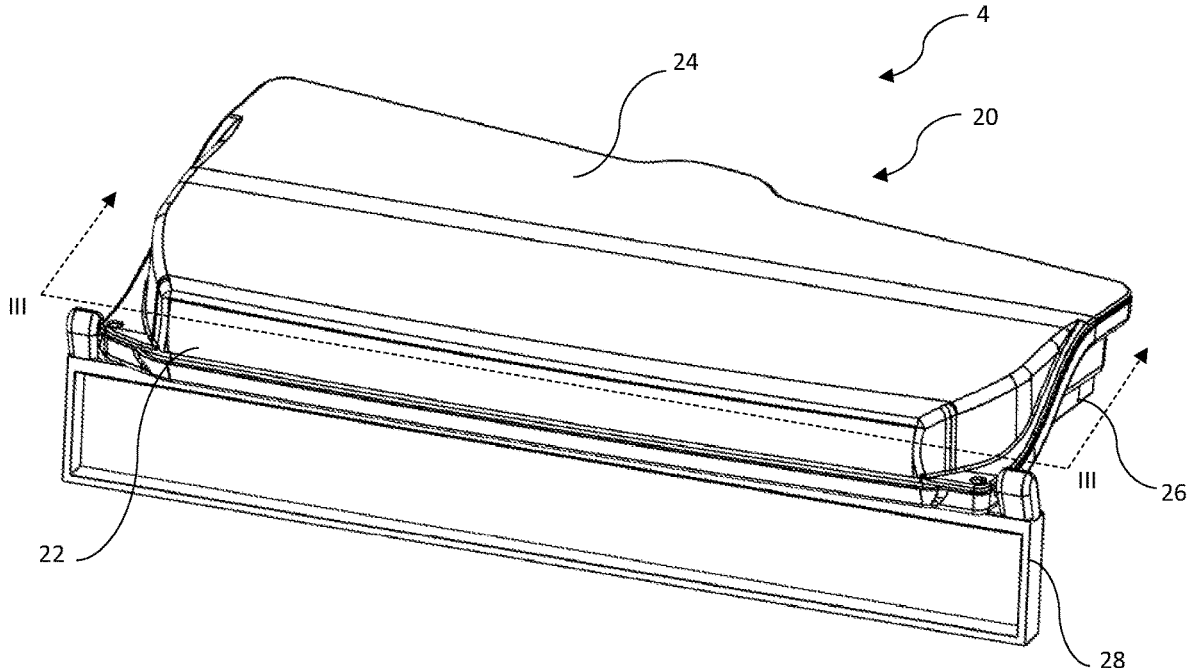
FIG. 2A is a front isometric view of a light system.

FIG. 2A is a front perspective view of the light system 4 connected to a bracket 28. The light system 4 includes a housing 20. The housing 20 is made up of a lens 22 that extends between an upper housing 24 and a lower housing 26. The lower housing 26 is connected to the bracket 28 and is movable relative to the bracket 28 so that light extending through the lens 22 may be aimed to a predetermined direction.

Figures 2B, 3:
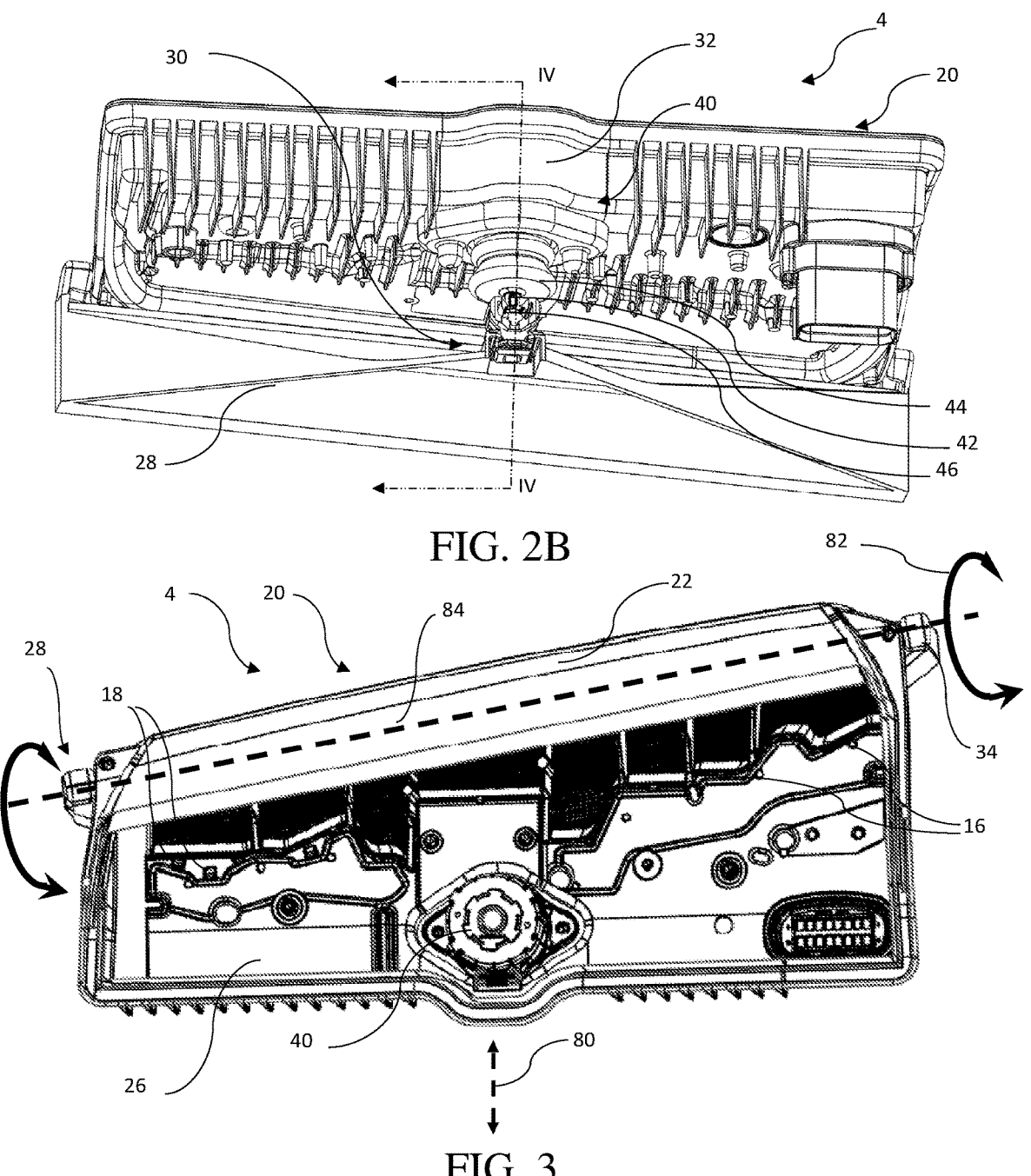
FIG. 2B illustrates a rear bottom isometric view of the light system of FIG. 2A.
FIG. 3 is cross-sectional view of FIG. 2A along line III-III.

FIG. 2B is a bottom rear perspective view of the light system 4 and bracket 28. The rear side of the housing 20 includes a motor housing 32 that contains a motor 40 (e.g., motor body) therein. A shaft 42 of the motor 40 extends out of the housing 20 so that the motor is capable of moving the light system. The shaft 42 and a bottom of the motor housing 32 are covered by a seal 44 and a shaft joint 46. The shaft joint 46 connects the motor 40 to the bracket 28 via a motor connector 30 of the bracket 28. During operation, the motor 40 moves the shaft 42 so that the light system 4 is moved relative to the bracket 28 to adjust the light system 4.

FIG. 3 is a top cross-sectional view of the light system 4 of FIG. 2A along line III-III. The upper housing 24 of the housing 20 is removed so that interior components of the light system 4 are exposed. The interior of the light system 4 has reflectors 16 aligned with light sources 18 that are located above the lower housing 26. The housing 20 is connected to a bracket 28. The bracket 28 has arms 34 that connect to the housing 20 at a front end. The bracket 28 is in communication with the motor 40 at a rear end. The motor 40 moves the housing 20 in a first direction 80. As the housing 20 moves in the first direction 80 the front of the housing rotates in a second direction 82 about an axis 84. For example, if the rear end moved downward in the first direction 80 the front end rotates upward in the second direction 82 about the axis 84.

Figure 4:
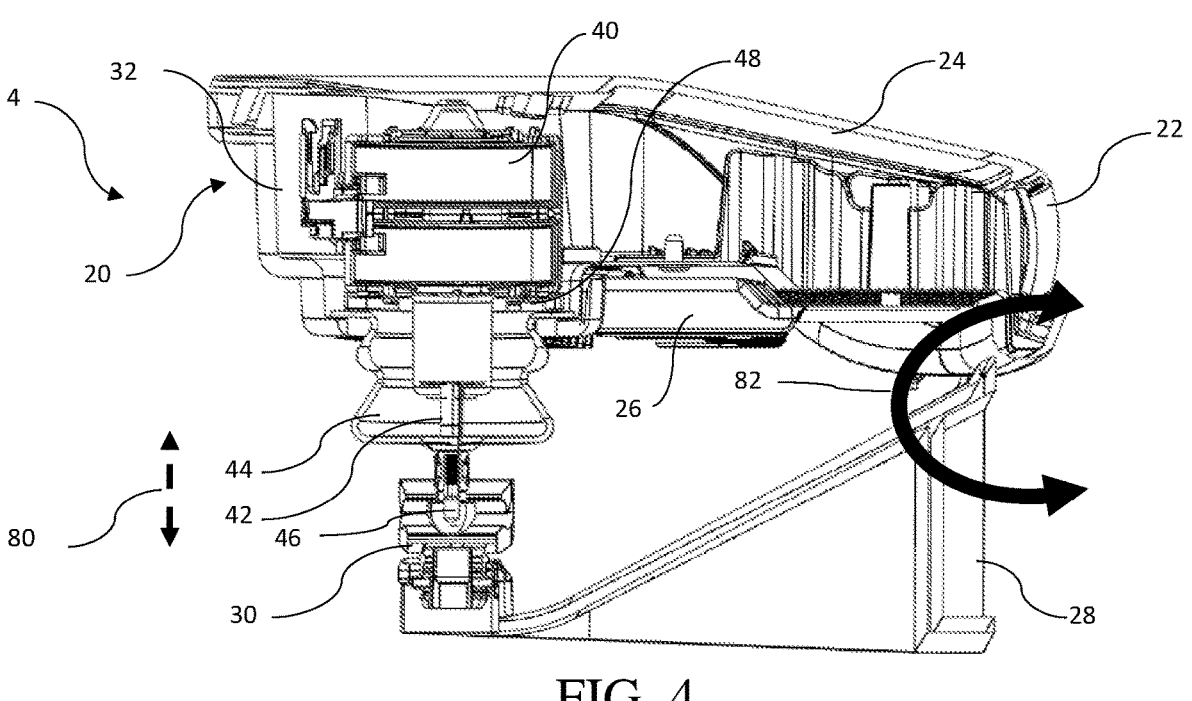
FIG. 4 is a cross-sectional view of FIG. 2B along line IV-IV.

FIG. 4 is a side cross-sectional view of the light system 4 along line IV-IV of FIG. 2B. The light system 4 has a housing 20 with a lens 22 located between an upper housing 24 and a lower housing 26. The housing 20 includes a motor housing 32 that contains a portion of a motor 40. The motor 40 includes a shaft 42 that extends out of the motor housing 32. The shaft 42 and opening in the motor housing 32 are contained within a seal 44 and shaft joint 46. The shaft joint 46, as shown, extends into a motor connector 30 of a bracket 28. The motor 40 moves the shaft 42 in the first direction 80. As the shaft 42 moves in the first direction 80, the light system 4 rotates about a forward end of the bracket 28 in the second direction 82. The seal 44 is connected to the lower housing 26 via a retainer 48. The seal 44 is sandwiched between the retainer 48 and the lower housing 26 so that the seal 44 is held in place.

Figure 5:
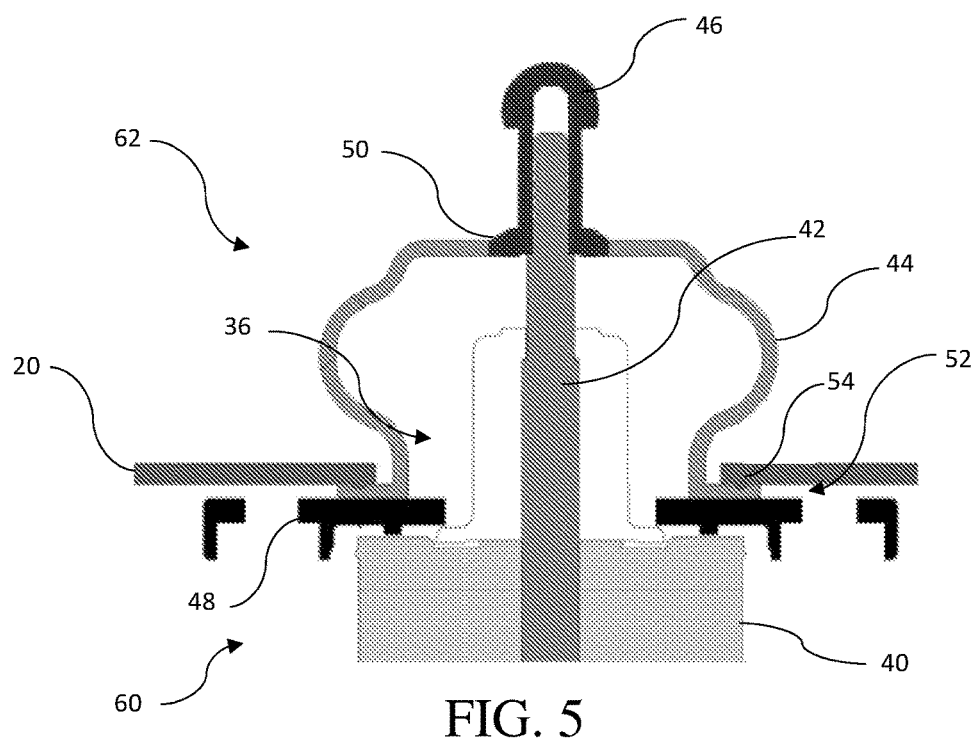
FIG. 5 is a cross-sectional close-up view of an unsealed motor connected to a housing.

FIG. 5 is a close-up cross-sectional view of a seal 44 extending around a shaft 42 and opening in the housing 20 as the shaft 42 extends through an opening 36 in the housing 20 to an outside (i.e., exterior) 62 of the housing. The seal 44 is connected to a shaft joint 46 by a joint 50 so that the seal and shaft joint 46 move with the shaft 42. The joint 50 connects the seal 44 and shaft joint 46 together. The seal 44 and shaft joint 46 encapsulate the shaft 42 so that the shaft 42 and motor 40 are protected from fluids and debris. A second end of the seal 44 is connected to the housing 20 by the seal 44 being sandwiched between the seal 44 and a retainer 48 in a sealing area 52. As shown, the retainer 48 is located on an inside 60 of the housing 20 proximate to the motor 40. The sealing area 52 has a sealing projection 54 that assists in forming a seal around the opening in the housing 20. As shown, the seal 44 and shaft joint 46 enclose the shaft 42 and opening in the housing 20 to prevent fluid from contacting the motor 40.

FIG. 6A is a side view the unsealed motor 40 with the shaft 42 extending out of a housing 20 (e.g., the motor housing 32). As shown, the shaft 42, seal 44, and shaft joint 46 are located in a first position 90 where the shaft joint 46 extends above the motor housing 32 a distance $H_1$. The seal 44 is connected to the housing 20 in a sealing area 52 where the seal 44 is located between the motor housing 32 and a retainer 48. The seal 44 includes expansion regions 56 that are compressed in the first position 90 to accommodate the distance $H_1$.

FIG. 6B illustrates the motor 40 extending the shaft 42 into a second position 92. In the second position 92 the shaft 42 is extended a distance $H_2$. In the second position 92 the shaft joint 46 moves away from the housing 20 (e.g., motor housing 32) and the seal 44 extends outward to maintain the sealing around the opening in the motor housing 32 and the shaft 42. An end of the seal 44 adjacent to the motor housing 32 is connected to the motor housing 32 in a sealing area 52 between a retainer 48 and the motor housing 32 so that the expansion regions 56 are movable while maintaining protection to the shaft and interior of the motor housing 32.

FIG. 7 illustrates a side view of a motor 40 located on an inside 60 of the housing 20 (e.g., motor housing 32) with a shaft 42 and shaft joint 46 located on an exterior 62 of the motor housing 32. The shaft 42 extends through a sealing area 52 in the motor housing 32 and retainer 48. As shown, an outer seal 44A is located adjacent to the exterior 62 and an inner seal 44B is located adjacent to an inside (i.e., interior) 60 of the motor housing 32. The seals 44 extend between the shaft 42 and the motor housing 32 and retainer 48 to prevent fluids and/or debris from contacting the motor 40.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements, ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Light System
6 Outer Lens
8 Controller
10 Adjustment Mechanism
11 Sensor
12 Daytime Running Light.
14 Turn Signal
16 Reflector
18 Light Source
20 Housing
22 Lens
24 Upper Housing
26 Lower Housing
28 Bracket
30 Motor Connector
32 Motor Housing
34 Bracket Arm
36 Opening
40 Motor 42 Shaft
44 Seal
44A Outer Seal
44B Inner Seal
46 Shaft Joint
48 Retainer
50 Joint
52 Sealing Area
54 Sealing Projection
60 Inside Housing
62 Outside Housing

We claim:

1. A light system comprising:
a housing that is connectable within a vehicle, the housing including an interior and an exterior;
light sources located within the interior of the housing;
a motor located within the interior of the housing adjacent to the light sources and the motor having a portion that extends through an opening in the housing to the exterior of the housing so that the motor is capable of moving the light system relative to the vehicle; and
one or more seals that prevent fluids and/or debris from contacting the portion that extends through the opening in the housing, the opening in the housing, or both.

2. The light system of claim 1, wherein the housing is sealed so that the motor on the interior of the housing is protected from fluids, debris, or both.

3. The light system of claim 1, wherein the portion of the motor extending through the opening to the exterior of the housing is a shaft of the motor, and the one or more seals is a single seal that is connected adjacent to the housing and is flexible to move with the shaft.

4. The light system of claim 3, the one or more seals include one or more expansion regions that expand or contract as the shaft moves so that the one or more seals prevent the fluids and/or the debris, from contacting the shaft, the opening, or both.

5. The light system of claim 3, further comprising:
a shaft joint connected to an end of the shaft, the shaft joint being movable relative to the vehicle as the motor moves the shaft.

6. The light system of claim 5, wherein the one or more seals are connected to the shaft joint by one or more joints.

7. The light system of claim 1, wherein the motor is an unsealed motor.

8. The light system of claim 1, wherein the one or more seals are connected to the housing by a portion of the one or more seals being sandwiched between the housing and a retainer.

9. The light system of claim 8, wherein the one or more seals, the retainer, the housing, or a combination thereof comprise one or more seal projections that assist in connecting the one or more seals to the housing.

10. A light system comprising:
a housing that is connectable within a vehicle;
light sources located within the housing;
a motor located within the housing with the light sources;

one or more seals, connected to and extending from the housing, that prevent fluids and/or debris from contacting the motor; and
a shaft of the motor extending out of the housing into contact with one or more brackets in communication so that as the shaft is moved by the motor, the housing is moved relative to the one or more brackets and the vehicle.

11. The light system of claim 10, wherein a front end of the one or more brackets are connected to the housing by one or more bracket arms, and the housing is pivotable relative to the one or more brackets.

12. The light system of claim 11, wherein housing is movable around a single axis relative to the one or more bracket arms.

13. The light system of claim 11, wherein a rear end of the bracket is connected to the shaft of the motor so that the housing is movable by the motor to pivot about the one or more brackets.

14. The light system of claim 13, wherein the one or more seals include one or more expansion regions that expand and contract as the shaft is moved by the motor.

15. The light system of claim 10, further comprising:
a shaft joint located at an end of the shaft of the motor, the shaft joint and the one or more seals being connected by one or more joints.

16. The light system of claim 10, wherein the shaft extends through an opening in the housing and the one or more seals are located within the opening to prevent fluid, debris, or both from extending into the housing.

17. The light system of claim 16, wherein the one or more seals include an inner seal facing an interior of the housing and an outer seal facing an exterior of the housing with the inner seal and the outer seal are co-axial.

18. The light system of claim 10 further comprising:
a controller in communication with the motor, the controller controlling the motor so that the motor moves the housing relative to the one or more brackets.

19. The light system of claim 10, wherein the motor is free of any sealing that prevents from fluids from contacting the motor.

20. A system comprising:
light sources;
an unsealed motor comprising:
a motor body, and
a shaft extending from the motor body;
a housing receiving the light sources and the motor body and including an opening that the shaft of the motor extends through so that the shaft is located external of the housing;
one or more seals in communication with the housing and the shaft, a shaft joint, or both to separate the motor body, the shaft, or both from an environment external to the housing so that the motor body is sealed within the housing.

\* \* \* \* \*